United States Patent
Solis et al.

(10) Patent No.: US 8,466,240 B2
(45) Date of Patent: Jun. 18, 2013

(54) METHODS OF IMPROVING CROSSLINKABILITY OF POLYETHYLENE POLYMER COMPRISING POLAR COMONOMER AND POLYMER COMPOSITIONS

(75) Inventors: Scott C. Solis, Houston, TX (US); Danny Van Hoyweghen, Heverlee (BE); Daniel J. Dobson, Hoboken, NJ (US); Arthur G. Voepel, Jackson, LA (US); Cindy Dewitte, Puurs (BE); Paul J. Clymans, Kapelle-Op-Den-Bos (BE); Ashley R. Kropf, Uniontown, OH (US); Joel E. Schmieg, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 17 days.

(21) Appl. No.: 13/252,662

(22) Filed: Oct. 4, 2011

(65) Prior Publication Data

US 2013/0085241 A1    Apr. 4, 2013

(51) Int. Cl.
 C08F 2/00       (2006.01)
 C08F 20/06      (2006.01)
 C08F 18/00      (2006.01)
 C08F 210/00     (2006.01)

(52) U.S. Cl.
 USPC ............ 526/64; 526/66; 526/317.1; 526/319; 526/348

(58) Field of Classification Search
 USPC .......................... 526/64, 66, 317.1, 319, 348
 See application file for complete search history.

(56) References Cited

U.S. PATENT DOCUMENTS

| | | | |
|---|---|---|---|
| 5,508,205 A | 4/1996 | Dominguez et al. | |
| 5,539,075 A * | 7/1996 | Gustafsson et al. | 526/339 |
| 6,066,796 A | 5/2000 | Itoyama et al. | |
| 6,420,646 B2 | 7/2002 | Benz et al. | |
| 7,449,629 B2 | 11/2008 | Ferri et al. | |
| 2005/0037219 A1 | 2/2005 | Ohlsson et al. | |
| 2007/0032614 A1 | 2/2007 | Goossens et al. | |
| 2008/0245405 A1 | 10/2008 | Garvison et al. | |
| 2008/0276983 A1 | 11/2008 | Drake et al. | |
| 2009/0101204 A1 | 4/2009 | Levy et al. | |
| 2009/0162666 A1 | 6/2009 | Daniel | |

FOREIGN PATENT DOCUMENTS

| WO | WO 2007/002618 | 1/2007 |
|---|---|---|
| WO | 2010/081684 | 4/2010 |

* cited by examiner

Primary Examiner — William Cheung
(74) Attorney, Agent, or Firm — Robert L. Abdon

(57) ABSTRACT

Processes for producing high pressure polyethylene and processes for increasing the crosslinkability of high pressure polyethylene are disclosed. The processes comprise controlling particular reaction parameters that have been found to promote crosslinkability in the resulting high pressure polyethylene. High pressure polyethylenes having improved crosslinkability are also disclosed.

20 Claims, 1 Drawing Sheet

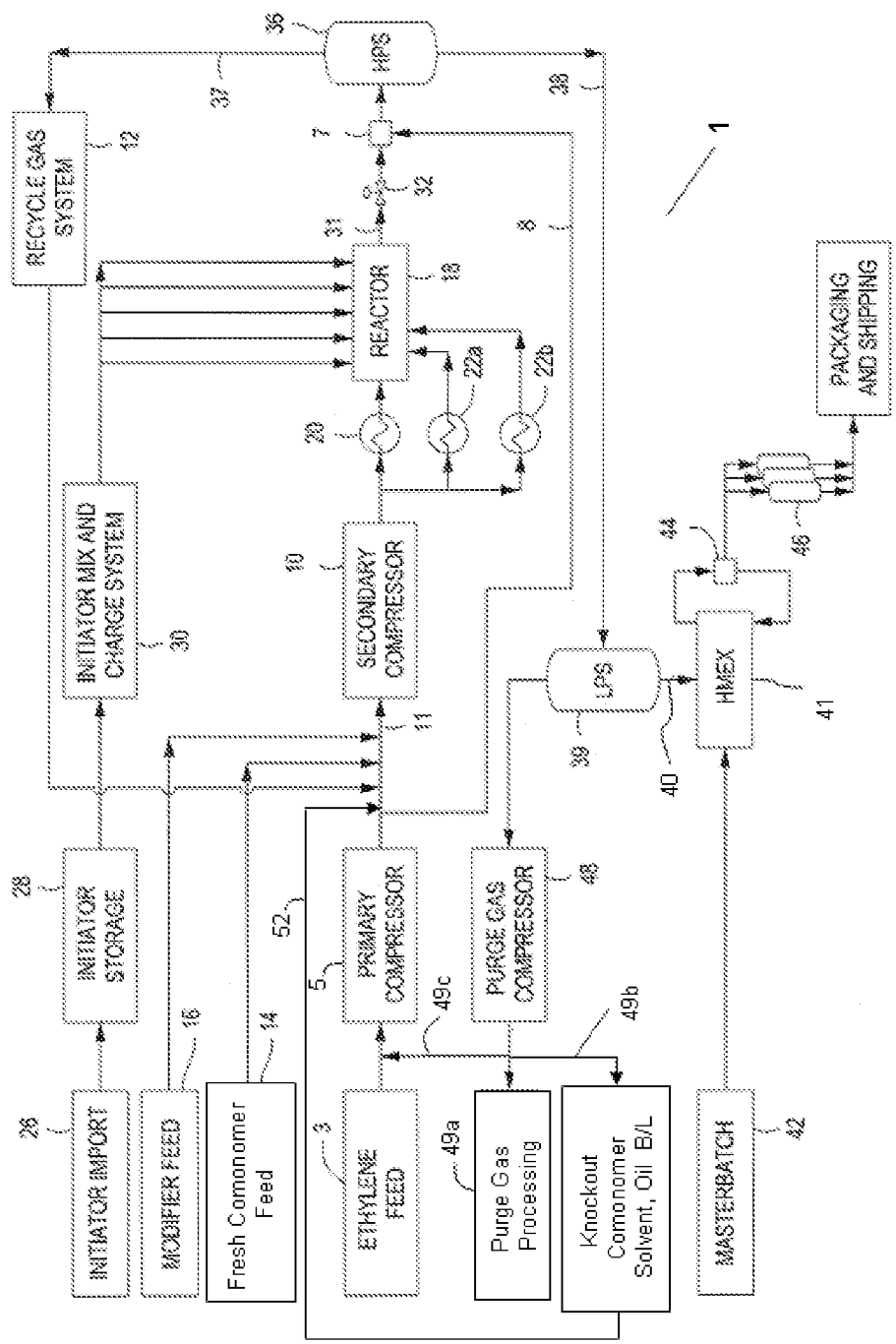

METHODS OF IMPROVING CROSSLINKABILITY OF POLYETHYLENE POLYMER COMPRISING POLAR COMONOMER AND POLYMER COMPOSITIONS

FIELD OF THE INVENTION

Embodiments described herein generally relate to high pressure, polyethylene processes and resins made therefrom. More particularly, embodiments described herein relate to ethylene/polar comonomer (e.g., vinyl acetate) resins with improved crosslinkability and processes for producing same.

BACKGROUND

Encapsulant layers for photovoltaic (PV) modules are typically made of ethylene vinyl acetate (EVA) resin. PV modules can include crystalline silicon wafers that are connected together and embedded in a laminating film. The laminating film and the embedded wafers are typically sandwiched between two layers (or panels) of glass, a polymeric material, or other suitable materials. PV modules can also include amorphous silicon, cadmium-telluride (CdTe) or copper-indium-diselenide, CuInSe2 (commonly referred to as "CIS"), or a similar semiconductor material deposited as a thin film on a substrate by well known physical vapor deposition ("PVD") or chemical vapor deposition ("CVD") techniques. To complete the construction, the layers are etched and an adhesive is applied over the etched PV cell. A backing material is then applied over the assembly adhesive.

Typically, two encapsulant layers are used, one below and one above the etched PV cell, to provide moisture, oxygen, and electrical isolation to the cell. The encapsulant layer that covers the face of the cell is typically transparent. The other encapsulant or "back sheet" is disposed on a "substrate" layer such as a trilayer PVF/PET/PVF (TPT) laminate sheet or other adequate polymer backsheets. A metal or polyimide film have been used, adjacent to the back sheet to provide further protection against outside influences, such as moisture. Additional details of PV modules and their construction methods can be found in U.S. Pat. No. 5,508,205; U.S. Pat. No. 6,066,796; U.S. Pat. No. 6,420,646; U.S. Pat. No. 7,449,629; US 2008-0245405; US 2008-0276983; US 2009-0101204; US 2009-0162666; and WO 2007-002618, for example.

To increase production or lower the cost of production of PV modules, producers are continually trying to increase output rates or decrease reaction temperatures needed to laminate the EVA resin encapsulant layer on the PV cell assembly. For example, producers have used higher amounts of peroxide crosslinking agents or peroxide crosslinking agents at lower temperatures. Producers have also tried peroxides with two or more reactive sites (reacting with different activation energies), and/or mixes of low and high temperature crosslink agents. Producers have further tried crosslink enhancers such as tri-allyl isocyanurate (TAIC) to increase the crosslinkability of the EVA resin, which reduces the lamination times. Such post-polymerization conversions are very time consuming and/or costly. It is much more desirable to produce a neat EVA resin with an increased intrinsic crosslinkability to increase production rates of PV modules.

There is a need, therefore, for an improved EVA resin with increased crosslinkability and processes for making the same.

SUMMARY

In one aspect, embodiments of the invention provide a process for producing high pressure polyethylene, comprising: contacting first amounts of ethylene; a polar comonomer; and one or more C3 to C12 unsaturated modifiers in the presence of a first amount of initiator in a reaction system at sufficient reaction conditions, wherein a reaction system effluent comprises the polyethylene resin, a comonomer recycle stream comprising unreacted polar comonomer, and purge gas recycle stream comprising purge gas; removing at least a portion of the purge gas from purge gas recycle stream; removing at least a portion of the unreacted polar comonomer from the comonomer recycle stream; and continuing the reaction in the reaction system by contacting second portions of ethylene, polar comonomer, and one or more C3 to C12 unsaturated modifiers.

In another aspect, embodiments of the invention provide a process for increasing the crosslinkability of a high pressure polyethylene, comprising: contacting first amounts of ethylene, a polar comonomer, and one or more C3 to C12 unsaturated modifiers in the presence of a first amount of initiator in a reaction system at sufficient reaction conditions, wherein a reaction system effluent comprises the polyethylene resin, a comonomer recycle stream comprising unreacted polar comonomer, and purge gas recycle stream comprising purge gas; removing at least a portion of the purge gas from purge gas recycle stream; removing at least a portion of the unreacted polar comonomer from the comonomer recycle stream; and continuing the reaction in the reaction system by contacting second portions of ethylene, polar comonomer, and one or more C3 to C12 unsaturated modifiers, wherein the polyethylene resin has a melt index of about 0.1 g/10 min to about 500 dg/min.

In still another aspect, embodiments of the invention provide a copolymer produced in a high pressure polymerization process, comprising: at least 50.0 wt. % ethylene; at least 20.0 wt. % polar comonomer, and 0.4 wt. % to 4.0 wt. % units derived from a C3 to C12 unsaturated modifier, based on the total weight of the copolymer, wherein the copolymer has a melt index as measured according to ASTM D1238 (2.16 kg, 190° C.) from $0.15 \times 10^2$ and $0.50 \times 10^2$ dg/min and a crosslink index (MH–ML) of at least 2.0 dN*m, preferably >2.2 dN*m, preferably >2.4 dN*m.

In yet another aspect, embodiments of the invention provide a process for producing high pressure polyethylene having increased crosslinkability, comprising: contacting first portions of ethylene, a polar comonomer, and one or more C3 to C12 unsaturated modifiers in the presence of a first portion of an initiator in a reaction system at sufficient reaction conditions to produce an effluent comprising polyethylene resin, an unreacted portion of polar comonomer, and purge gas; controlling the reaction conditions to maintain a ratio of the concentration of the one or more C3 to C12 unsaturated modifiers to the concentration of the polar comonomer to provide the polyethylene having the target crosslink index (MH–ML); isolating the polyethylene resin having the target crosslink index (MH–ML), wherein the target crosslink index (MH–ML) is at least 5.0% higher than the crosslink index (MH–ML) of a comparable high pressure polyethylene prepared under substantially the same conditions except that the controlling step is not performed.

BRIEF DESCRIPTION OF THE DRAWINGS

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 schematically depicts an illustrative high pressure polymerization system suitable for producing a polyethylene polymer comprising polar copolymer according to one or more embodiments described.

DETAILED DESCRIPTION

It has been surprisingly discovered that a high pressure polyethylene ("HPPE") resin having a significant increase in crosslinkability can be produced without any appreciable, i.e., negligible, change in melt index. It has also been surprisingly discovered that a high pressure ethylene vinyl acetate resin ("HEVA") having a significant increase in crosslinkability can be produced without any appreciable, i.e., negligible, change in melt index and vinyl acetate content. Increasing the crosslinkability of a HPPE resin, especially a HEVA resin, can improve its final properties and decrease processing time for fabricating PV modules. Increasing the crosslinkability of an EVA encapsulant layer, for example, provides decreased cycle time, which means increased productivity for the converters. Increased crosslinkability of the EVA encapsulant layer also improves the structural stability of the PV cell and protection against mechanical impacts, chemical attack, or environmental impact, providing longevity and increased electrical isolation. Increased crosslinkability of the EVA encapsulant layer further is further believed to provide improved chemical and weather resistance and wear resistance.

The HPPE resin can have a density of 0.9 g/cm$^3$ to 1.2 g/cm$^3$, or 0.92 g/cm$^3$ to 1.0 g/cm$^3$, or 0.94 g/cm$^3$ to 0.98 g/cm$^3$, or 0.92 g/cm$^3$ to 0.96 g/cm$^3$. The density can also range from a low of about 0.90 g/cm$^3$, 0.92 g/cm$^3$, or 0.94 g/cm$^3$ to a high of about 0.98 g/cm$^3$, 1.0 g/cm$^3$, or 1.2 g/cm$^3$. Such values are measured at room temperature per the ASTM D-1505 test method.

The HPPE resin can have a melt index ("MI") or melt flow rate ("MFR"), as measured according to ASTM D1238, 2.16 kg, 190° C., of less than $5.00 \times 10^2$ or $4.00 \times 10^2$ or $3.00 \times 10^2$ or $2.00 \times 10^2$ or $1.00 \times 10^2$ or $0.50 \times 10^2$ or $0.40 \times 10^2$ g/10 min. The MI can also range from a low of about 0.10, 1.00, 5.00, or 10.00 g/10 min to a high of about $0.20 \times 10^2$, $0.30 \times 10^2$, $0.40 \times 10^2$, $0.50 \times 10^2$, $1.00 \times 10^2$, or $5.00 \times 10^2$ g/10 min. The MI can also range from a low of about $0.15 \times 10^2$, $0.25 \times 10^2$, or $0.40 \times 10^2$ g/10 min to a high of about $0.45 \times 10^2$, $0.50 \times 10^2$, or $0.55 \times 10^2$ g/10 min. The terms "MI" and "MFR" are used interchangeably herein and refer to the measure of the viscosity of polymers that is expressed as the weight of material which flows from a capillary of known dimensions under a 2.16 kg load at 190° C. for a measured period of time, and is measured in grams/10 minutes according to ASTM D1238.

The crosslinkability of the HPPE resin can be measured according to its crosslink index (MH–ML). MH–ML is the measured difference in torque level of the molten EVA resin before curing (ML) and after full curing (MH). The cure torque profile is measured over time (15 minutes) on a MDR 2000 Rheometer (Alpha Technologies) at 150° C. of a sample of the resin to which 4 phr of the peroxide masterbatch Trigonox 29-40B (40 wt. % 1,1-Di(tert-butylperoxy)-3,3,5-trimethylcyclohexane in a carrier) is added in a preliminary low temperature (well above the melt temperature of the polymer but also well below the initiation temperature of the peroxide, preferably below 100° C. or 90° C.) blending step using blend mixer such as roll-mixers or other mixing equipment. In certain embodiments, the crosslink index (MH–ML) is about 1.0 dN*m to about 6.0 dN*m. The crosslink index (MH–ML) can also range from a low of about 1.0 dN*m, 1.5 dN*m, or 1.8 dN*m to a high of about 2.0 dN*m, 2.2 dN*m, or 4.5 dN*m. The crosslink index (MH–ML) can also range from a low of about 1.2 dN*m, 1.8 dN*m, or 2.2 dN*m to a high of about 2.4 dN*m, 2.9 dN*m, or 3.3 dN*m. In certain embodiments, the crosslink index (MH–ML) can be at least 2.0 dN*m or at least 2.2 dN*m or at least 2.4 dN*m.

The melting point of the HPPE resin can be about 40° C. or less, as measured by industry acceptable thermal methods, such as Differential Scanning calorimetry (DSC). The melting point of the HPPE resin can range from about 40.0° C. to about 90.0° C. The melting point of the HPPE resin can also range from a low of about 40.0° C., 45.0° C., or 50.0° C. to a high of about 55.0° C., 65.0° C., or 75.0° C. The melting point of the HPPE resin can also be 40.0° C. to 80.0° C.; 50.0° C. to 70.0° C.; 55.0° C. to 65.0° C.; or about 60.0° C.

The Vicat softening point of the HPPE resin can be about 20.0° C. to about 80.0° C., as measured by ASTM D1525. The Vicat softening point can also range from a low of about 20° C., 25.0° C., or 30.0° C. to a high of about 35.0° C., 40.0° C., or 50.0° C. The Vicat softening point of the HPPE resin can also be 20.0° C. to 70.0° C.; 30.0° C. to 60.0° C.; 35.0° C. to 45.0° C.; about 35.0° C., or 40.0° C.

The HPPE resin has at least 5.0 wt. % units derived from ethylene and 0.1 wt. % to 10.0 wt. % units derived from one or more modifiers, based on the total weight of the resin. Typically the amount of ethylene is about 50.0 wt. % to about 99.0 wt. %; about 55.0 wt. % to about 95.0 wt. %; about 60.0 wt. % to about 90.0 wt. %; or about 65.0 wt. % to about 95.0 wt. %. Ethylene copolymers have an amount polymer units derived from ethylene of from about 50.0 wt. %, 51.0 wt. %, or 55.0 wt. % to about 80.0 wt. %, 90.0 wt. %, or 98.0 wt. %.

Suitable modifiers, also called chain transfer agents, can include, but are not limited to, tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-butene-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, 1-butene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2,1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, proprionaldehyde, and phosphine. Further details and other suitable transfer agents are described in Advances In Polymer Science, Vol. 7, pp. 386-448 (1970).

Preferably, the HPPE contains one or more C3 to C12 unsaturated modifiers. The C3 to C12 unsaturated modifiers contain at least one unsaturation but can also contain multiple conjugated or non-conjugated unsaturations. In case of multiple unsaturations, it is preferred that they are non-conjugated. In certain embodiments, the unsaturation of the C3 to C12 unsaturated modifier can be di-substituted with one or more alkyl groups in the beta position. Preferred C3 to C12 unsaturated modifiers include propylene, isobutylene, or a combination thereof.

The amount of the modifier(s) can range from a low of about 0.1 wt. %, 0.3 wt. %, or 0.8 wt. % to a high of about 3.0 wt. %, 6.0 wt. %, or 10.0 wt. %, based on the total weight of the resin. The amount of the modifier(s) can also range from a low of about 0.2 wt. %, 0.4 wt. %, or 0.8 wt. % to a high of about 1.5 wt. %, 2.5 wt. %, 3.6 wt. % or 5 wt. %, based on the total weight of the resin. The amount of the modifier can also be 0.1 wt. % to 8 wt. %; 0.2 wt. % to 6 wt. %; 0.3 wt. % to 6 wt. %; 0.3 wt. % to 4 wt. %; 0.4 wt. % to 4.0 wt. %; 0.6 wt. % to 4 wt. %; 0.4 wt. % to 3.5 wt. %; or 0.5 wt. % to 3.8 wt. %, based on the total weight of the resin.

The HPPE resin can optionally include polymer units derived from one or more polar comonomers. The amount of polymer units derived from polar comonomers can be up to 95.0 wt. % and can also range from about 1.0 wt. % to about 5.0 wt. %; about 1.0 wt. % to about 49.0 wt. %; about 5.0 wt. % to about 45.0 wt. %; about 10.0 wt. % to about 50.0 wt. %; about 10.0 wt. % to about 40.0 wt. %; or about 30.0 wt. % to about 45.0 wt. %, based on the total weight of the resin. The amount of polymer units derived from polar comonomers can also range from a low of about 1.0 wt. %, 4.0 wt. %, or 7.0 wt. % to a high of about 30.0 wt. %, 40.0 wt. %, or 45.0 wt. %. Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylamino-ethyl ether; olefins such as propylene, butene-1, cis-butene-2, trans-butene-2, isobutylene, 3,3-dimethylbutene-1,4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate and vinyl methyl sulfide.

Preferably, the polar comonomer is vinyl acetate (VA). The resulting ethylene vinyl acetate (EVA) resin can have about 5.0 wt. % to about 95.0 wt. %, typically about 20.0 wt. % to about 80.0 wt. %, polymer units derived from vinyl acetate, based on the amounts of polymer units derived from ethylene and vinyl acetate. The amount of polymer units derived from vinyl acetate range from a low of about 20.0 wt. %, 25.0 wt. %, 30.0 wt. %, 35.0 wt. %, or 40.0 wt. % to a high of about 45.0 wt. %, 50.0 wt. %, 55.0 wt. %, 60.0 wt. %, or 80.0 wt. %, based on the total weight of the resin. In certain embodiments, the EVA resin can further include polymer units derived from one or more comonomer units selected from propylene, butene, 1-hexene, 1-octene, and/or one or more dienes. Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

The HPPE resin can also contain one or more antioxidants. Phenolic antioxidants are preferred, such as butylated hydroxytoluene (BHT) or other derivatives containing butylated hydroxytoluene units such as Irganox 1076 or Irganox 1010 and alike. The antioxidant can be present in an amount less than 0.05 wt. %, based on the total weight of the resin. When present, for example, the amount of the one or more antioxidants can range from a low of about 0.001 wt. %, 0.005 wt. %, 0.01 wt. %, or 0.015 wt. % to a high of about 0.02 wt. %, 0.03 wt. %, 0.04 wt. %, or 0.05 wt. %.

The HPPE resin can further contain one or more additives. Suitable additives can include, but are not limited to: stabilization agents such as antioxidants or other heat or light stabilizers; anti-static agents; crosslink agents or co-agents; crosslink promotors; release agents; adhesion promotors; plasticizers; or any other additive and derivatives known in the art. Suitable additives can further include one or more anti-agglomeration agents, such as oleamide, stearamide, erucamide or other derivatives with the same activity as known to the person skilled in the art. Preferably, the HPPE resin contains less than 0.15 wt. % of such additives, based on the total weight of the resin. When present, the amount of the additives can also range from a low of about 0.01 wt. %, 0.02 wt. %, 0.03 wt. %, or 0.05 wt. % to a high of about 0.06 wt. %, 0.08 wt. %, 0.11 wt. %, or 0.15 wt. %.

The reactor mixture to produce the HPPE resin can further contain one or more initiators. Suitable initiators can include, but are not limited to, oxygen, peroxide compounds such as hydrogen peroxide, decanoyl peroxide, t-butyl peroxy neodecanoate, t-butyl peroxypivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, di (2-ethyl, hexyl) peroxydicarbonate, and 1,1,3,3-tetramethyl butyl hydroperoxide; alkali metal persulfates, perborates and percarbonates; and azo compounds such as azo bis isobutyronitrile. Organic peroxide initiators are preferred. Suitable organic peroxide initiators can include t-butyl peroxy neodecanoate, t-butyl peroxypivalate, t-butyl peroxy-2-ethyl hexanoate, t-butyl peroxy isobutyrate, and di (2-ethyl, hexyl) peroxydicarbonate. Particularly preferred is di (2-ethyl, hexyl) peroxydicarbonate. Preferably, the reaction mixture contains less than 0.25 wt. % initiator, based on the total weight of the reaction mixture. The amount of the initiator(s) can also range from a low of about 0.01 wt. %, 0.025 wt. %, 0.035 wt. %, or 0.05 wt. % to a high of about 0.06 wt. %, 0.08 wt. %, 0.10 wt. %, 0.15 wt. %, 0.2 wt. % or 0.25 wt. %, based on the total weight of the reaction mixture.

One or more diluents/solvents can be added to the initiator. Suitable diluents/solvents can include one or more non-coordinating, inert liquids including, but not limited to, straight and branched-chain hydrocarbons such as propane, isobutane, butane, pentane, isopentane, hexanes, isohexane, heptane, octane, n-octane, dodecane, isododecane, and mixtures thereof; cyclic and alicyclic hydrocarbons such as cyclohexane, cycloheptane, methylcyclohexane, methylcycloheptane, and mixtures thereof such as can be found commercially (Isopars™ from ExxonMobil); perhalogenated hydrocarbons such as perfluorinated C4 to C10 alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, isobutylene, 1-hexene, 1-pentene, 3-methyl-1-pentene, 4-methyl-1-pentene, 1-octene, and 1-decene. In certain embodiments, the initiator can include butane, n-octane, or a mixture of one or more C9 to C12 paraffinic hydrocarbons.

The HPPE resin can be produced in any suitable high pressure polymerization process. FIG. 1 schematically depicts an illustrative high pressure polymerization system 1 suitable for producing a high pressure polyethylene resin, according to one or more embodiments described. The system 1 can include an ethylene feed source 3 that supplies ethylene monomer to a first compressor 5 that pressurizes the ethylene to a pressure of about 150 bar to 200 bar (15 MPa to 20 MPa), or about 200 bar to 300 bar (20 MPa to 30 MPa), or about 300 bar to 350 bar (30 MPa to 35 MPa). Under normal operating conditions, all or substantially all of the ethylene discharged from the first compressor 5 is directed to a jet pump 7 via line 8. A second compressor 10 located downstream of, and in fluid communication with the first compressor 5, increases the pressure of the reactor feed (line 11), which includes the ethylene feed discharged from the first compressor 5. The second compressor 10 boosts the reactor feed 11 to a pressure of greater than or equal to about 1,500 bar (150 MPa), or greater than or equal to about 2,000 bar (200 MPa), or greater than or equal to about 2,500 bar (250 MPa), or greater than or equal to about 3,000 bar (300 MPa).

As indicated in FIG. 1, other reaction components can be injected into the suction inlet of the second compressor 10 along with the ethylene monomer, including one or more other comonomers from comonomer feed 14. One or more modifiers from modifier feed 16 can also be injected into the suction inlet of the second compressor 10 along with the ethylene monomer and one or more comonomers.

The compressed reactor feed stream exiting the second compressor 10 can be split into two or more streams. At least one split stream can be heated in one or more heaters 20 before entering the reactor 18. At least two other split streams can be cooled in one or more coolers 22a, 22b and introduced to the reactor 18 at different points. The reactor 18 can also include two or more initiator injection points along its length, if a tubular reactor, or at various zones, if an autoclave. The initiator and optionally one or more diluents/solvents can be fed to the reactor 18 from an initiator injection system that can include one or more initiator sources 26, one or more initiator storage vessels 28, and one or more initiator mix and charge systems 30.

From the reactor 18, the exiting mixture of polymer alone or in combination with unreacted monomer (also referred to as "the product stream") via stream 31 can pass through a high pressure let down valve 32. The high pressure let down valve 32 can be controlled to maintain the desired pressure in the reactor 18. From the high pressure let down valve 32, the product stream can flow through the jet pump 7 and then into a separation system that can include one or more high pressure separation ("HPS") vessels 36 and one or more low pressure separation ("LPS") vessels 39.

The high pressure separation vessel 36 can separate the product stream 31 into a stream of unreacted monomer gas 37 and a polymer rich liquid or liquid phase 38. The separated monomer gas can be directed to a recycle gas system 12. The recycle gas system 12 can include one or more waste heat boilers, one or more coolers for cooling the recycle gas, and one or more knock-out pots for dewaxing. The cooled and dewaxed gas exiting the recycle system 12 can flow back to the reactor feed 11 of the second compressor 10.

The polymer rich liquid 38 can be further separated in the one or more low pressure separation vessels 39. The low pressure separation vessel 39 can operate at a pressure of from 0.5 to 2.0 bar (50 to 200 kPa). Molten polymer leaves the low pressure separation vessel 39 via an outlet in the bottom of that vessel (line 40) and passes through a conduit into the intake of one or more hot melt extruders 41. One or more additives to modify the properties of the extruded polymer can be added to the extruder 41 via one or more sources 42 of masterbatch additives. The one or more extruders 41 converts the molten polymer into strings that are chopped, cooled, dried via one or more dryers 44, and then transferred to one or more blenders 46. The polymer resin can then be packaged and shipped to an end user, such as a PV cell converter.

In the low pressure separation vessel 39, at least a portion, if not all, of the remaining monomer is recovered as an off gas that is compressed in one or more purge gas compressors 48. Any portion of the compressed purge gas can be sent to off-site storage sites 49a and 49b. Likewise, any portion of the compressed purge gas can be recycled to the inlet of the primary compressor 5 via the purge gas recycle (PGR) stream 49c. For example, about 10.0 vol %, 20.0 vol %, 30.0 vol %, 40.0 vol %, 50.0 vol %, 60.0 vol %, 70.0 vol %, 80.0 vol %, 90.0 vol %, or 95.0 vol % of the purge gas recycle (PGR) stream 49c can be sent to off-site storage sites or further processing equipment 49a and 49b, and the balance can be recycled to the inlet of the primary compressor 5. In some embodiments, the amount of recycle to the inlet of the primary compressor 5 via the purge gas recycle (PGR) stream 49c can be reduced by about 10.0%, 20.0%, 30.0%, 50.0%, 70.0%, 80.0%, or 90.0% (vol./vol.) to purge or otherwise remove inerts from the system.

The inerts from the purge gas, however, can have a detrimental effect on the crosslinkability of the HPPE resin and thus, are best removed or significantly eliminated by purging these derivatives from the reaction mixture via the purge gas stream 49a. As explained in more detail below, reducing or eliminating the PGR stream 49c, increases the modifier content in the reaction mixture, which results in significantly better crosslinkability of the polymer product for a given melt index. The amount of modifier can be determined based on the modifier consumption rate, which is the ratio of the modifier added to reaction mixture via line 16 to the polymer production rate via line 40 (modifier to production ratio). The modifier to production ratio is preferably about 0.4 wt. % to about 4.0 wt. %.

In some embodiments, the unreacted vinyl acetate monomer can be separated from the purge gas recycle (PGR) stream 49c in the off-site system 49b. The separated vinyl acetate monomer can then be recycled to the inlet of the secondary compressor 10 via a recycle vinyl acetate (R-VAM) stream 52. As explained in more detail below, the amount of the recycle stream 52 can vary depending on the desired melt index and crosslinkability of the resin.

The reactor 18 can be a tubular or autoclave reactor each having multiple reaction zones. A tubular reactor is a continuous, plug flow loop reactor. An autoclave reactor is a continuous-stirred-tank reactor (CSTR) with an agitator to promote good mixing. The multiple zones of the reactor 18 allows for manipulation of the temperature profile throughout the polymerization process, which allows for tailoring of product properties.

The average reaction temperature can be about 140.0 to about 190.0° C. As used herein, the term "average reaction temperature" is calculated using the formula appropriate for the type of reactor used in the polymerization.

Formula for Tubular Reactor $$T_{avg,TUB} = \frac{\sum_{i}^{N} pol_i \times \left(\frac{T_{PKi} + T_{LOi}}{2}\right)}{\sum_{i}^{N} pol_i}$$

where poli=polymer quantity produced in zone i; TPKi=Peak temperature of reaction zone I; and TLOi=Lite off temperature of reaction zone I;

Formula for Autoclave Reactor $$T_{avg,AC} = \frac{\sum_{i}^{N} pol_i \times (T_{Zi})}{\sum_{i}^{N} pol_i}$$

where poli=polymer quantity produced in zone i, and TZi=Temperature of reaction zone i.

The polymerization reaction can be conducted by reacting ethylene and the one or more optional monomers, modifiers, initiators, and/or solvents in the presence of a catalyst system at a temperature of about 300° C. or less, 200° C. or less, 180° C. or less, or 170° C. or less at a pressure of at least $18.00 \times 10^2$ bar, at least $19.00 \times 10^2$ bar, at least $20.00 \times 10^2$ bar, at least $25.00 \times 10^2$ bar, at least $27.00 \times 10^2$ bar, at least $29.00 \times 10^2$ bar, or at least $30.00 \times 10^2$ bar. Suitable catalysts and catalyst systems are well known in the art.

It has been unexpectedly discovered that lowering the average reactor temperature by modifying or adapting the set temperatures in certain zones of the reactor and increasing the reactor pressure can provide better crosslinkability. It has also been unexpectedly discovered that reducing or eliminating the content of certain saturated derivatives in the reactor that have a modifying activity in the polymerization process, and/or adding fresh ethylene and monomer (optional) to the reactors also improves the crosslinkability of the resulting HPPE resin. All these steps reduce or eliminate the build up of inerts, i.e., non reactive components, in the polymerization system, and maximize the unsaturated modifier concentration in the reaction zone.

As a consequence of these actions, the unsaturated modifier content can be maximized to maintain the target melt index of the HPPE resin. As the unsaturated modifier adds unsaturation to the resin, and in the case of using isobutylene as a modifier, dimethyl branches are added, so the resin's crosslinking will be improved. Not wishing to be bound by theory, it is believed that the foregoing process change(s), whether alone or in any combination, increases the melt viscosity of the resin. Consequently, an increased incorporation of unsaturated modifier in the HPPE resin results, thereby producing an HPPE with significantly increased vinyl content at a given melt index.

Eliminating or reducing the amount of additives also helps increase the crosslinkability of the resulting HPPE resin. For example, minimizing the amount of the anti-oxidant can improve crosslinking for otherwise similar reaction conditions.

EXAMPLES

The foregoing discussion can be further described with reference to the following non-limiting examples, which shows the polymerization results for making HEVA resin having significantly increased crosslinkability in both a tubular and autoclave process.

Examples 1-7

Seven HEVA resins (Examples 1-7), according to embodiments described herein, and five comparative HEVA resins (Comparative Examples 1-5) were polymerized in a tubular reactor process at similar process conditions, using the same cure blend. Table 1 below summarizes the results. The test results show that increasing the propylene consumption (by decreasing the Purge Gas Recycle) significantly improves the crosslinkability of the resin. The test results also show that lowering the average reactor temperature significantly improves the crosslinkability of the resin.

TABLE 1

| | Tubular reactor process results | | | | | | |
|---|---|---|---|---|---|---|---|
| Grade name | Crosslinkability MH-ML (dN.m) | Avg. Ratio Propylene/Production rate (lb/klb) | Avg. Calculated BHT concentration (ppm) | Purge Gas Recycle/ Production Rate (lb/klb) | Avg. VA content (wt. %) | Avg. Melt Index (g/10') | Average reactor temperature (° C.) |
| Comp 1 | 1.84 | 4.2 | 235 | 199 | 31.6 | 43.6 | 176 |
| Comp 2 | 1.61 | 5.2 | 247 | 253 | 30.5 | 42.9 | 175 |
| Comp 3 | 1.68 | 5.9 | 212 | 154 | 31.6 | 37.1 | 178 |
| Comp 4 | 1.87 | 7.1 | 235 | 220 | 31.5 | 43.1 | 175 |
| Comp 5 | 1.98 | 9.2 | 235 | 101 | 31.7 | 43.0 | 176 |
| Ex. 1 | 2.18 | 10.9 | 235 | 0 | 30.6 | 42.9 | 176 |
| Ex. 2 | 2.32 | 13.3 | 235 | 0 | 32.1 | 43.9 | 162 |
| Ex. 3 | 2.34 | 14.4 | 350 | 0 | 31.8 | 41.7 | 162 |
| Ex. 4 | 2.45 | 15.3 | 235 | 0 | 31.5 | 40.4 | 160 |
| Ex. 5 | 2.44 | 16.5 | 235 | 0 | 31.4 | 44.1 | 163 |

TABLE 1-continued

Tubular reactor process results

| Grade name | Cross-linkability MH-ML (dN.m) | Avg. Ratio Propylene/Production rate (lb/klb) | Avg. Calculated BHT concentration (ppm) | Purge Gas Recycle/ Production Rate (lb/klb) | Avg. VA content (wt. %) | Avg. Melt Index (g/10') | Average reactor temperature (° C.) |
|---|---|---|---|---|---|---|---|
| Ex. 6 | 2.49 | 16.5 | 235 | 0 | 31.6 | 42.2 | 157 |
| Ex. 7 | 2.70 | 20.1 | 235 | 0 | 31.1 | 38.6 | 152 |

The crosslink index (MH−ML) is the measured difference in torque level of the molten resin before (ML) and after (MH) full curing. The cure torque profile was measured over time (15 minutes) on a MDR 2000 Rheometer (Alpha Technologies) at 150° C.

The propylene consumption is indicated by the average ratio of propylene to production rate. The average calculated An improvement in crosslinkability was also observed when reducing (Example 14) or eliminating butylated hydroxytoluene (BHT) addition (Example 15) to the reactor. A comparison of Example 14 with Example 13 shows that by significantly reducing the BHT for otherwise similar reaction conditions the crosslinkability is increased. A comparison of Example 15 with Example 13 shows that by taking out the BHT for otherwise similar reaction conditions the crosslinkability is increased.

TABLE 2

Autoclave reactor process results

| Grade name | Cross-linkability MH-ML (dN.m) | Avg. Ratio Isobutylene/Production rate (kg/T) | Avg. Calculated BHT concentration (ppm) | RVAM/ Prod (kg/T) | Avg. VA content (wt. %) | Avg. Melt Index (g/10') | Average reactor temperature (° C.) |
|---|---|---|---|---|---|---|---|
| Comp 6 | 1.77 | 0 | 229 | 160 | 31.4 | 43.9 | 168 |
| Comp 7 | 2.14 | 2.7 | 224 | 187 | 31.3 | 45 | 164 |
| Comp 8 | 2.31 | 4.1 | 287 | 43 | 31.7 | 42.4 | 165 |
| Comp 9 | 2.39 | 4.3 | 225 | 45 | 31.6 | 42.6 | 167 |
| Ex. 8 | 2.52 | 5.7 | 236 | 0 | 31.6 | 41.0 | 165 |
| Ex. 9 | 2.58 | 6.6 | 237 | 0 | 31.5 | 42.1 | 168 |
| Ex. 10 | 2.66 | 7.2 | 260 | 0 | 31.4 | 43.6 | 166 |
| Ex. 11 | 2.74 | 9.1 | 225 | 0 | 31.2 | 43.1 | 164 |
| Ex. 12 | 2.74 | 9.3 | 236 | 0 | 31.4 | 43.1 | 165 |
| Ex. 13 | 2.81 | 9.7 | 197 | 0 | 32.1 | 42.2 | 159 |
| Ex. 14 | 2.81 | 8.9 | 110 | 0 | 31.3 | 42.5 | 165 |
| Ex. 15 | 2.85 | 9.9 | 0 | 0 | 32.0 | 43.3 | 159 |

BHT concentration (ppm) is determined using the formula below:

Concentration BHT (ppm)=(Total additive flow rate (kg/h)/Production rate (T/h))×0.25×1000−30 ppm.

The cure blend was produced as follows: to 100 phr polymer was added 4 phr of Trigonox 29-40B peroxide masterbatch. This polymer-peroxide mix was then blended and masticated at 80° C. on an Agila Roll Mill until a homogeneous blend was formed. A portion of the homogeneous blend was then inserted between the plates of the MDR 2000 Rheometer where the crosslinkability of the pre-mix was measured.

Examples 8-13

Six HEVA resins (Examples 8-13), according to embodiments described herein, and four comparative HEVA resins (Comparative Examples 6-9) were made in an autoclave process. Isobutylene was used as the modifier. A significant improvement in crosslinkability was observed by increasing the consumption rate of isobutylene, as indicated by the average ratio of isobutylene to production rate. This increased isobutylene consumption was achieved by increasing the purge gas flow with no consumption of recycled vinyl acetate monomer (R-VAM).

Particular Embodiments

Embodiment A. A process for producing high pressure polyethylene, comprising:
contacting first amounts of ethylene, a polar comonomer, and one or more C3 to C12 unsaturated modifiers in the presence of a first amount of initiator in a reaction system at sufficient reaction conditions, wherein a reaction system effluent comprises the polyethylene resin, a comonomer recycle stream comprising unreacted polar comonomer, and purge gas recycle stream comprising purge gas;
removing at least a portion of the purge gas from purge gas recycle stream;
removing at least a portion of the unreacted polar comonomer from the comonomer recycle stream; and
continuing the reaction in the reaction system by contacting second portions of ethylene, polar comonomer, and one or more C3 to C12 unsaturated modifiers.

Embodiment B. The process of Embodiment A, wherein the polyethylene resin comprises about 5 wt. % to about 95 wt. % polymer units derived from the polar comonomer and 5.0 wt. % to 95.0 wt. % polymer units derived from ethylene, based on the total weight of the polyethylene resin.

Embodiment C. The process of Embodiment A or B, wherein the polar comonomer comprises vinyl acetate and the polyethylene resin comprises about 30.0 wt. % to about 45.0 wt. % polymer units derived from vinyl acetate monomer and at least 50.0 wt. % polymer units derived from ethylene, based on the total weight of the polyethylene resin.

Embodiment D. The process of any of Embodiments A-C, wherein the reaction conditions comprise an average reactor temperature of about 190° C. or less.

Embodiment E. The process of any of Embodiments A-D, wherein the reaction conditions comprise a reactor pressure of at least $18.00 \times 10^2$ bar.

Embodiment F. The process of any of Embodiments A-E, wherein removing at least a portion of the purge gas recycle stream minimizes species in the reaction process other than the ethylene, polar comonomer, one or more C3 to C12 unsaturated modifiers, and initiator.

Embodiment G. The process of any of Embodiments A-F, wherein the reaction system is selected from the group consisting of multiple reaction zone tubular reactors, autoclave reactors, and combinations thereof.

Embodiment H. The process of any of Embodiments A-G, wherein the reactor system comprises a multiple reaction zone tubular reactor and each reaction zone, and wherein the reaction conditions include an average reaction temperature of about 140° C. to about 190° C. in each of the multiple reaction zones.

Embodiment I. The process of any of Embodiments A-H, wherein the first amount of the one or more C3 to C12 unsaturated modifiers is from 0.4 wt. % to 4.0 wt. %, based on the total first amounts of ethylene, polar comonomer, one or more C3 to C12 unsaturated modifiers, and initiator in the reaction system.

Embodiment J. The process of Embodiment I, wherein the one or more C3 to C12 unsaturated modifiers is selected from isobutylene or propylene or a combination thereof.

Embodiment K. The process of any of Embodiments A-J wherein removing a portion of the purge gas recycle comprises removing at least 30 wt. %, preferably at least 50 wt. %, at least 75 wt. %, at least 90 wt. %, or 100 wt. % of the purge gas recycle.

Embodiment L. The process of any of Embodiments A-K, wherein removing at least a portion of remaining portion of the polar comonomer from the reaction system includes removing at least 30 wt. %, preferably at least 50 wt. %, at least 75 wt. %, at least 90 wt. %, or 100 wt. % of the remaining portion of the polar comonomer from the reaction system.

Embodiment M. A process for increasing the crosslinkability of a high pressure polyethylene, comprising:
contacting first amounts of ethylene, a polar comonomer, and one or more C3 to C12 unsaturated modifiers in the presence of a first amount of initiator in a reaction system at sufficient reaction conditions, wherein a reaction system effluent comprises the polyethylene resin, a comonomer recycle stream comprising unreacted polar comonomer, and purge gas recycle stream comprising purge gas;
removing at least a portion of the purge gas from purge gas recycle stream;
removing at least a portion of the unreacted polar comonomer from the comonomer recycle stream; and
continuing the reaction in the reaction system by contacting second portions of ethylene, polar comonomer, and one or more C3 to C12 unsaturated modifiers,
wherein the polyethylene resin has a melt index of about 0.1 g/10 min to about 500 dg/min.

Embodiment N. The process of Embodiment M, wherein the polyethylene resin has a melt index from $0.40 \times 10^2$ and $0.45 \times 10^2$ dg/min and a polar comonomer content from 30.0 and 35.0 wt. %, and a crosslink index (MH–ML) of at least 2.0 dN*m, preferably >2.2 dN*m, preferably >2.4 dN*m.

Embodiment O. The process of any of Embodiments M-N, wherein the reaction conditions comprise a reactor temperature of about 190° C. or less, and a reactor pressure of at least $18.00 \times 10^2$ bar.

Embodiment P. The process of any of Embodiments M-O, wherein removing at least a portion of the purge gas recycle stream minimizes species in the reaction process other than the ethylene, polar comonomer, one or more C3 to C12 unsaturated modifiers, and initiator.

Embodiment Q. The process of any of Embodiments M-P, wherein the first amount of the one or more C3 to C12 unsaturated modifiers is from 0.4 wt. % to 4.0 wt. %, based on the total first amounts of ethylene, polar comonomer, one or more C3 to C12 unsaturated modifiers, and initiator in the reaction system.

Embodiment R. The process of any of Embodiments M-Q, wherein the one or more C3 to C12 unsaturated modifiers is selected from isobutylene or propylene or a combination thereof.

Embodiment S. The process of any of Embodiments M-R, wherein the reaction system is selected from the group consisting of multiple reaction zone tubular reactors, autoclave reactors, and combinations thereof Embodiment T. The process of Embodiment S, wherein the reactor system comprises a multiple reaction zone tubular reactor and each reaction zone, and wherein the reaction conditions include an average reaction temperature of about 140° C. to about 190° C. in each of the multiple reaction zones.

Embodiment U. The process of any of Embodiments M-T wherein removing a portion of the purge gas recycle comprises removing at least 30 wt. %, preferably at least 50 wt. %, at least 75 wt. %, at least 90 wt. %, or 100 wt. % of the purge gas recycle.

Embodiment V. The process of any of Embodiments M-U wherein removing at least a portion of remaining portion of the polar comonomer from the reaction system includes removing at least 30 wt. %, preferably at least 50 wt. %, at least 75 wt. %, at least 90 wt. %, or 100 wt. % of the remaining portion of the polar comonomer from the reaction system.

Embodiment W. A copolymer produced in a high pressure polymerization process, comprising: at least 50.0 wt. % ethylene; at least 20.0 wt. % polar comonomer, and 0.4 wt. % to 4.0 wt. % units derived from a C3 to C12 unsaturated modifier, based on the total weight of the copolymer, wherein the copolymer has a melt index as measured according to ASTM D1238 (2.16 kg, 190° C.) from $0.15 \times 10^2$ and $0.50 \times 10^2$ dg/min and a crosslink index (MH–ML) of at least 2.0 dN*m, preferably >2.2 dN*m, preferably >2.4 dN*m.

Embodiment X. The copolymer of Embodiment W, wherein the polar comonomer is vinyl acetate.

Embodiment Y. The copolymer of any of Embodiments W-X, wherein the copolymer has a melt index between about 40 dg/min and about 45 dg/min and a vinyl acetate content of about 30 wt. % to about 35 wt. %.

Embodiment Z. The copolymer of any of Embodiments W-Y, wherein the C3 to C12 unsaturated modifier is propylene, isobutylene, or a combination thereof.

Embodiment AA. The copolymer of any of Embodiments W-Z, wherein the unsaturation of the C3 to C12 unsaturated modifier is di-substituted with one or more alkyl groups in the beta position.

Embodiment AB. The copolymer of any of Embodiments W-AA, wherein the C3 to C12 unsaturated modifier comprises one or more non-conjugated unsaturations.

Embodiment AC. The copolymer of any of Embodiments W-AB, wherein the copolymer has a crosslink index (MH−ML) of at least 2.2 dN*m.

Embodiment AD. The copolymer of any of Embodiments W-AC, wherein the copolymer has a crosslink index (MH−ML) of at least 2.4 dN*m.

Embodiment AE. The copolymer of any of Embodiments W-AD, further comprising phenolic antioxidant in an amount less than 0.05 wt. %, based on the total weight of the copolymer.

Embodiment AF. The copolymer of Embodiment AE, wherein the phenolic antioxidant comprises butylated hydroxytoluene (BHT).

Embodiment AG. The copolymer of any of Embodiments W-AF, wherein the copolymer has a melt index, as measured according to ASTM D1238 (2.16 kg, 190° C.), of about $0.40 \times 10^2$ g/10 min to about $0.50 \times 10^2$ g/10 min.

Embodiment AH. The copolymer of any of Embodiments W-AG, wherein the polar comonomer comprises vinyl acetate and the copolymer comprises about 30.0 wt. % to about 45.0 wt. % polymer units derived from vinyl acetate monomer and at least 50.0 wt. % polymer units derived from ethylene, based on the total weight of the copolymer.

Embodiment AI. A process for producing high pressure polyethylene having increased crosslinkability, comprising:

contacting first portions of ethylene, a polar comonomer, and one or more C3 to C12 unsaturated modifiers in the presence of a first portion of an initiator in a reaction system at sufficient reaction conditions to produce an effluent comprising polyethylene resin, an unreacted portion of polar comonomer, and purge gas;

controlling the reaction conditions to maintain a ratio of the concentration of the one or more C3 to C12 unsaturated modifiers to the concentration of the polar comonomer to provide the polyethylene having the target crosslink index (MH−ML); and isolating the polyethylene resin having the target crosslink index (MH−ML), wherein the target crosslink index (MH−ML) is at least 5.0% higher than the crosslink index (MH−ML) of a comparable high pressure polyethylene prepared under substantially the same conditions except that the controlling step is not performed.

Embodiment AJ. The process of Embodiment AI, wherein the polyethylene resin has a melt index from $0.40 \times 10^2$ and $0.45 \times 10^2$ dg/min and a polar comonomer content from 30.0 and 35.0 wt. %, the target crosslink index is at least 2.0 dN*m, preferred higher than 2.2 dN*m, even more preferred higher than 2.4 dN*m.

Embodiment AK. The process of Embodiment AJ, wherein the polyethylene resin comprises about 5 wt. % to about 95 wt. % polymer units derived from the polar comonomer and 5.0 to 95.0 wt. % polymer units derived from ethylene, based on the total weight of the polyethylene resin.

Embodiment AL. The process of Embodiment AK, wherein the polar comonomer comprises vinyl acetate and the polyethylene resin comprises about 30.0 wt. % to about 45.0 wt. % polymer units derived from vinyl acetate monomer and at least 50.0 wt. % polymer units derived from ethylene, based on the total weight of the polyethylene resin.

Embodiment AM. The process of any of Embodiments AI-AL, wherein controlling the reaction conditions includes removing a portion of a purge gas recycle stream before returning the remaining portion of the purge gas recycle stream to the reaction system.

Embodiment AN. The process of Embodiment AM, wherein removing a portion of a purge gas recycle stream comprises removing at least 30.0 vol. %, preferably at least 50.0 vol. %, at least 75.0 vol. %, at least 90.0 vol. %, 95.0 vol. %, or 100 vol. % of the purge gas recycle.

Embodiment AO. The process of any of Embodiments AI-AN, wherein controlling the reaction conditions includes removing at least a portion of unreacted portion of the polar comonomer from the comonomer recycle stream before returning the comonomer recycle stream to the reaction system.

Embodiment AP. The process of Embodiment AO, wherein removing at least a portion of unreacted portion of the polar comonomer comprises removing at least 30.0 vol. %, preferably at least 50.0 vol. %, at least 75.0 vol. %, at least 90.0 vol. %, 95.0 vol. %, or 100 vol. % of the unreacted portion of the polar comonomer from the comonomer recycle stream before returning the comonomer recycle stream to the reaction system.

Embodiment AQ. The process of any of Embodiments AI-AP, wherein controlling the reaction conditions includes maintaining an average reactor temperature of about 190° C. or less, 180° C. or less, 170° C. or less, 160° C. or less, 150° C. or less, or 140° C.

Embodiment AR. The process of any of Embodiments AI-AQ, wherein controlling the reaction conditions includes maintaining a reactor pressure of at least $18.00 \times 10^2$ bar.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing high pressure polyethylene, comprising:
    contacting first amounts of ethylene, a polar comonomer, and one or more C3 to C12 unsaturated modifiers in the presence of a first amount of initiator in a reaction system at sufficient reaction conditions, wherein a reaction system effluent comprises the polyethylene resin, a comonomer recycle stream comprising unreacted polar comonomer, and purge gas recycle stream comprising purge gas;
    removing at least a portion of the purge gas from purge gas recycle stream;
    removing at least a portion of the unreacted polar comonomer from the comonomer recycle stream; and
    continuing the reaction in the reaction system by contacting second portions of ethylene, polar comonomer, and one or more C3 to C12 unsaturated modifiers.

2. The process of claim 1, wherein the polyethylene resin comprises about 5 wt. % to about 95 wt. % polymer units derived from the polar comonomer and 5.0 wt. % to 95.0 wt. % polymer units derived from ethylene, based on the total weight of the polyethylene resin.

3. The process of claim 1, wherein the reaction conditions comprise an average reactor temperature of about 190° C. or less.

4. The process of claim 1, wherein the reaction conditions comprise a reactor pressure of at least $18.00 \times 10^2$ bar.

5. The process of claim 1, wherein the reaction system is selected from the group consisting of multiple reaction zone tubular reactors, autoclave reactors, and combinations thereof.

6. The process of claim 1, wherein the first amount of the one or more C3 to C12 unsaturated modifiers is from 0.4 wt. % to 4.0 wt. %, based on the total first amounts of ethylene, polar comonomer, one or more C3 to C12 unsaturated modifiers, and initiator in the reaction system.

7. The process of claim 1, wherein removing a portion of the purge gas recycle comprises removing at least 30.0 vol. % of the purge gas recycle.

8. The process of claim 1, wherein removing at least a portion of remaining portion of the polar comonomer from the reaction system includes removing at least 30.0 vol. % of the remaining portion of the polar comonomer from the reaction system.

9. A process for increasing the crosslinkability of a high pressure polyethylene, comprising:
contacting first amounts of ethylene, a polar comonomer, and one or more C3 to C12 unsaturated modifiers in the presence of a first amount of initiator in a reaction system at sufficient reaction conditions, wherein a reaction system effluent comprises the polyethylene resin, a comonomer recycle stream comprising unreacted polar comonomer, and purge gas recycle stream comprising purge gas;
removing at least a portion of the purge gas from purge gas recycle stream;
removing at least a portion of the unreacted polar comonomer from the comonomer recycle stream; and
continuing the reaction in the reaction system by contacting second portions of ethylene, polar comonomer, and one or more C3 to C12 unsaturated modifiers,
wherein the polyethylene resin has a melt index of about 0.1 g/10 min to about 500 dg/min.

10. The process of claim 9, wherein the polyethylene resin has a melt index from $0.40 \times 10^2$ and $0.45 \times 10^2$ dg/min and a polar comonomer content from 30.0 and 35.0 wt. %, and a crosslink index (MH-ML) of at least 2.0 dN*m.

11. The process of claim 9, wherein the reaction conditions comprise a reactor temperature of about 190° C. or less, and a reactor pressure of at least $18.00 \times 10^2$ bar.

12. The process of claim 9, wherein the first amount of the one or more C3 to C12 unsaturated modifiers is from 0.4 wt. % to 4.0 wt. %, based on the total first amounts of ethylene, polar comonomer, one or more C3 to C12 unsaturated modifiers, and initiator in the reaction system.

13. The process of claim 9, wherein the reaction system is selected from the group consisting of multiple reaction zone tubular reactors, autoclave reactors, and combinations thereof.

14. The process of claim 9, wherein removing a portion of the purge gas recycle comprises removing at least 30 wt. % of the purge gas recycle.

15. The process of claim 9, wherein removing at least a portion of remaining portion of the polar comonomer from the reaction system includes removing at least 30 wt. % of the remaining portion of the polar comonomer from the reaction system.

16. A process for producing high pressure polyethylene having increased crosslinkability, comprising:
contacting first portions of ethylene, a polar comonomer, and one or more C3 to C12 unsaturated modifiers in the presence of a first portion of an initiator in a reaction system at sufficient reaction conditions to produce an effluent comprising polyethylene resin, an unreacted portion of polar comonomer, and purge gas;
controlling the reaction conditions to maintain a ratio of the concentration of the one or more C3 to C12 unsaturated modifiers to the concentration of the polar comonomer to provide the polyethylene having the target crosslink index (MH-ML);
isolating the polyethylene resin having the target crosslink index (MH-ML),
wherein the target crosslink index (MH-ML) is at least 5.0% higher than the crosslink index (MH-ML) of a comparable high pressure polyethylene prepared under substantially the same conditions except that the controlling step is not performed.

17. The process of claim 16, wherein controlling the reaction conditions includes removing a portion of a purge gas recycle stream before returning the remaining portion of the purge gas recycle stream to the reaction system.

18. The process of claim 16, wherein controlling the reaction conditions includes removing at least a portion of unreacted portion of the polar comonomer from the comonomer recycle stream before returning the comonomer recycle stream to the reaction system.

19. The process of claim 16, wherein controlling the reaction conditions includes maintaining an average reactor temperature of about 190° C. or less, 180° C. or less, 170° C. or less, 160° C. or less, 150° C. or less, or 140° C.

20. The process of claim 16, wherein controlling the reaction conditions includes maintaining a reactor pressure of at least $18.00 \times 10^2$ bar.

* * * * *